D. L. WEBSTER AND H. N. RUSSELL.
DRIFT SIGHT.
APPLICATION FILED AUG. 11, 1919.
1,419,335.  Patented June 13, 1922.
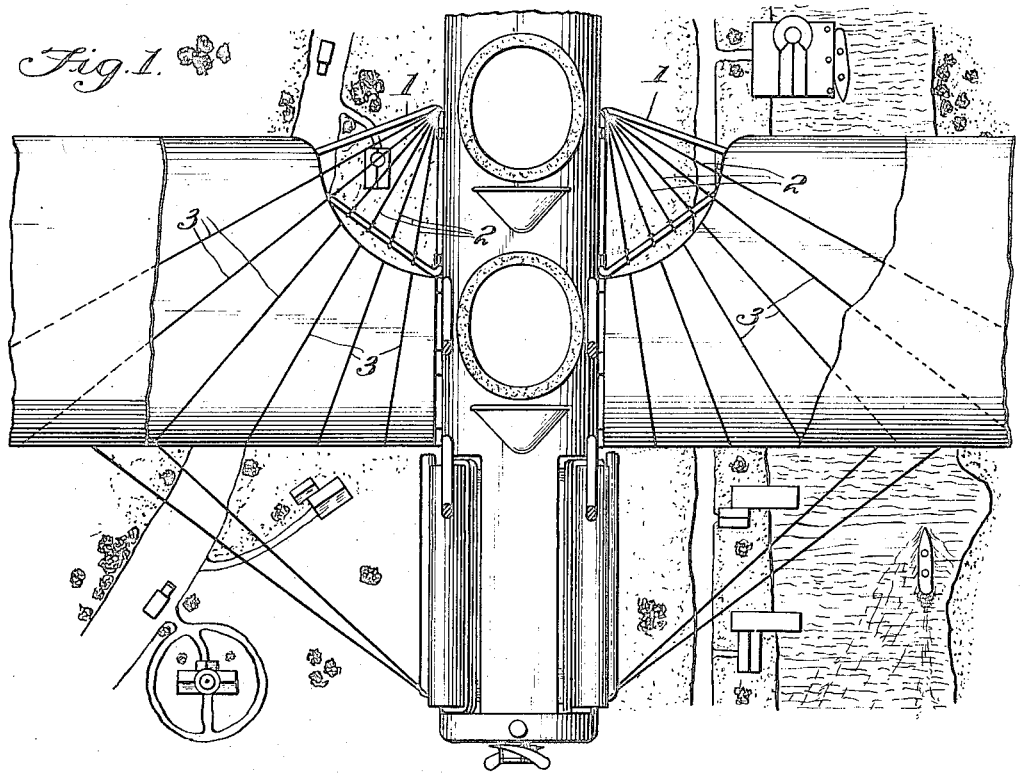
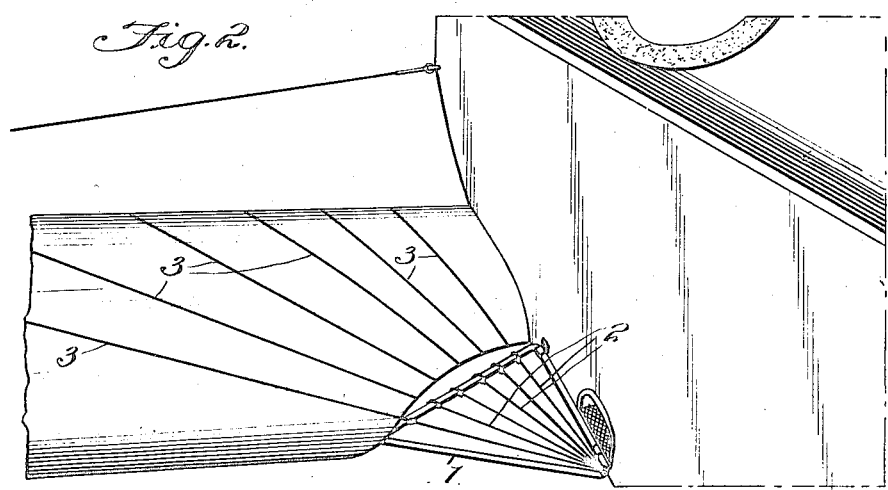

UNITED STATES PATENT OFFICE.

DAVID L. WEBSTER, OF BOSTON, MASSACHUSETTS, AND HENRY NORRIS RUSSELL, OF PRINCETON, NEW JERSEY.

DRIFT SIGHT.

1,419,335.

Specification of Letters Patent. Patented June 13, 1922.

Application filed August 11, 1919. Serial No. 316,756.

*To all whom it may concern:*

Be it known that we, DAVID L. WEBSTER and HENRY N. RUSSELL, citizens of the United States, residing at Boston, county of Suffolk, State of Massachusetts, and Princeton, county of Mercer, State of New Jersey, respectively, have invented certain new and useful Improvements in Drift Sights, of which the following is a specification.

The present invention relates to the provision of means adapted to be located on an airplane or other aircraft for accurately determining and correcting for the drift of said craft due to cross winds.

It is the particular object of the present device, or drift sight as it may be termed, to afford means whereby accurate drift measurements may be secured as quickly as possible. Such sources of error as bumpy air, slow rolling or yawing of the airplane, sideslip, changes of air-speed, changes of wind during the flight, etc., which are commonly encountered in the taking of drift measurements, are practically overcome, primarily due to the use of relatively long reference lines in the device so placed that they may be used in sighting objects at considerable distances from the airplane as well as near to it.

Other and further objects of the invention will appear as the nature of the same is better understood from consideration of the following description taken in conjunction with the drawing, which illustrates a preferred embodiment of the invention, and in which like numerals indicate like parts throughout the several views.

Fig. 1 represents a fragmentary plan view of the central portion of an airplane with the top wing removed showing the manner in which our invention is applied to the same, and Fig. 2, a perspective view looking forward from a position to the rear of the lower wing.

Referring to the drawing, it will be seen that the device is duplicated on each side of the fuselage of the airplane. This is necessary in order that the angle of drift may be taken on either side of the airplane whether it be drifting to one side or to the other. The device on one side of the fuselage only will be described, this description applying equally to the device on the opposite side.

The present sight which is intended primarily for use from the observer's or rear cock-pit of the airplane, although not restricted to use in this position, comprises in the construction shown, a triangular framework 1 mounted in proximity to the trailing edge of the lower wing of the airplane, preferably in the recess formed in the trailing edge of the wing adjacent the fuselage, and, secured in place by means of suitable connections between the framework and the wing and fuselage. Radiating from the rear corner of framework 1 adjacent the fuselage which corner may be termed the "center" of the device, and extending forward to the opposite side of framework 1, is a series of fixed sighting wires 2 arranged at uniform angle intervals, the first of said intervals coming between the side of framework 1 adjacent the fuselage and the first sighting wire. This side of framework 1 must be arranged parallel to the fore and aft line of the airplane, in order to enable a correct determination of the angle of drift to be made.

Framework 1 is so located that the corner thereof from which wires 2 radiate comes directly below the observer's eye when he leans his head out over the side of the ship. Sighting wires 2 being nearly horizontal in the arrangement shown, there is no necessity for the provision of a rear sight, and no special point from which the lines must be seen in order to read the angle of drift correctly.

In taking the first measurement of drift with the sight, since the wires 2 are fixed, any one wire cannot be made to appear fixed on an object or objects on the ground. Instead of this, it must be seen which wires are nearest to appearing fixed on the ground. An object should then be picked between these wires and observation made of what happens if the ship is so steered as to make that object move straight for the "center" guiding it by the converging wires 2. In order to prevent the ship from yawing, steering should be done by another object taken on the horizon ahead, means for which purpose will later be described. If the object being followed between the wires 2 strikes the "center" and the ship has not rolled, the true drift may be inferred from the point between the sighting wires from which the object started. For example, if the object started half way between the 20 and 30 degree lines, the drift is 25 degrees. The compass should then be corrected by this amount. That is, if the first estimate of drift is 25 degrees, and it is desired to make a course of 230 degrees (to the right from north), then the course should be altered to 205 degrees.

Although the above method gives a high degree of accuracy in the hands of a trained observer, a check on the original measurement and even greater accuracy may be had by a method of following an object on the ground from a long distance ahead.

For this purpose, the lines of sighting wires 2 are continued in the form of paint or other suitable lines 3 across the surface of the wing to the entering edge thereof. When the observer has obtained as good a measurement as he can from the wires 2 and corrected his compass course, as explained above, he picks an object well in front of the lower wing by the aid of the painted lines 3, and waits for the object to appear from behind the wing. For example, if his drift is 25 degrees, he looks at the 20 and 30 degree lines on the wing (which appears straight as seen from his seat) and imagines a line half way between the 20 and 30 degree lines, and picks his object on an imaginary continuation of this line. When the object picked appears behind the wing, he ought to pass directly over it. If he does not, he can guess how much his previous measurement was wrong and correct his course accordingly. Similarly, the paint lines 3 can be used to steer the ship by landmarks and tell quickly how to head her to pass over a landmark sighted way ahead.

The accuracy obtainable with the sight in steering cross-country courses, is about 1 degree, or steering by aid of the sight in strong variable winds, the airplane can be made to follow a course without leaving it by more than one mile in traveling sixty.

Although the invention has been shown in its preferred form and the details of construction thereof described more or less precisely, it is to be noted that any form of apparatus which utilizes long reference lines, either in the form of wires or partly wires and partly other marks on the airplane and so placed that they can be used in sighting objects at considerable distances from the airplane as well as nearer to it, would answer the same purposes; further, that it is not intended that the scope of the invention be limited to use in the particular position shown nor to the construction shown, as changes in form, the proportion of parts, and the substitution of equivalents, as circumstances may suggest or render expedient, may be made without departing from the spirit of the invention.

What we claim is:

1. An airplane having a fuselage, and wings extending laterally therefrom and at the lower part thereof, each of said wings being recessed at its trailing edge adjacent the fuselage, a frame secured in each recess and having wires radiating forwardly and outwardly from the fuselage, and said wings having lines marked on their upper surfaces in alinement with the wires of said frames.

2. An aircraft having a fuselage, and frames secured to opposite sides thereof and having sighting wires radiating forwardly and laterally from the fuselage.

3. An aircraft having a fuselage, and frames secured to opposite sides thereof and having sighting wires radiating forwardly and laterally from the fuselage, and wings extending from the fuselage and having marked thereon sighting lines in alinement with said sighting wires.

4. An aircraft having a fuselage, and triangular frames secured to opposite sides thereof and having sighting wires radiating forwardly and laterally from the fuselage.

5. An arcraft having a fuselage, and wings, and sighting wires radiating from a point adjacent the fuselage forwardly and laterally toward the wings.

6. An aircraft having a fuselage, and wings, having portions thereof cut away to provide observation spaces, and sighting wires radiating from a point adjacent the fuselage forwardly and laterally and extending across said observation spaces.

7. An air craft having a fuselage, and wings having portions thereof cut away to provide observation spaces, and sighting wires radiating from a point adjacent the fuselage forwardly and laterally and extending across said observation spaces, the wings having sighting lines marked thereon in alinement with said sighting wires and extending across the wings toward the entering edge thereof.

8. An aircraft having a fuselage, and wings having portions thereof cut away to provide observation spaces, and also having sighting lines marked on the wings and radiating from points adjacent the opposite sides of the fuselage forwardly and laterally, and sighting wires extending across said observation spaces in alinement with said sighting lines.

In testimony whereof we affix our signatures.

DAVID L. WEBSTER.
HENRY NORRIS RUSSELL.